No. 732,697. PATENTED JULY 7, 1903.
J. D. BATES.
LUMBER SURFACE METER.
APPLICATION FILED FEB. 19, 1903.
NO MODEL. 2 SHEETS—SHEET 2.
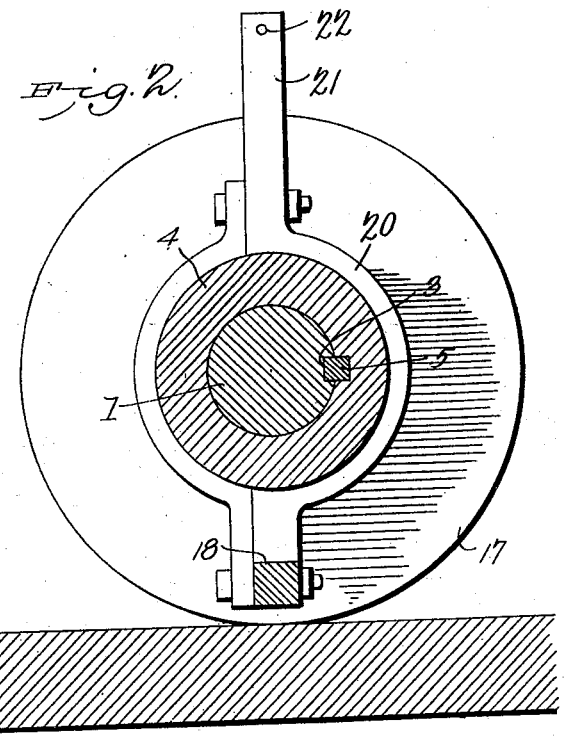
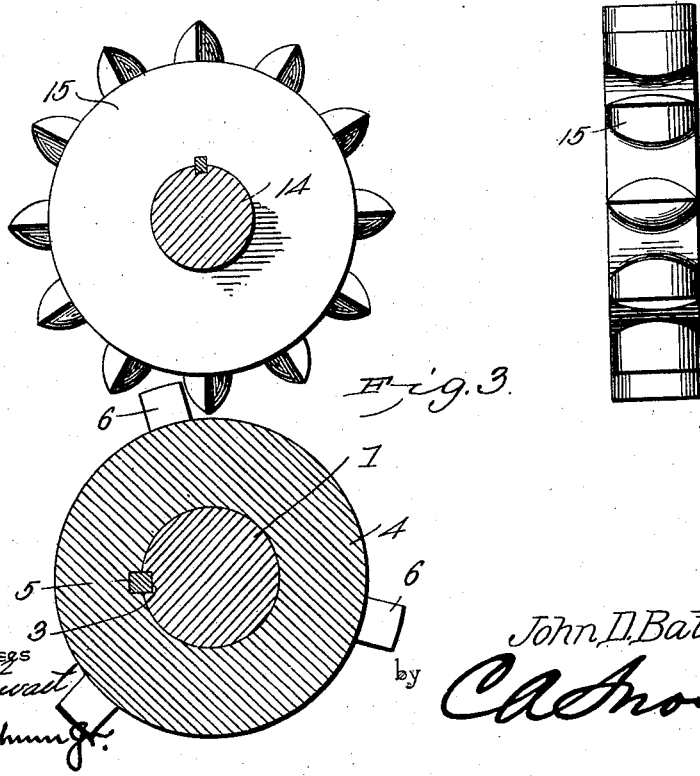
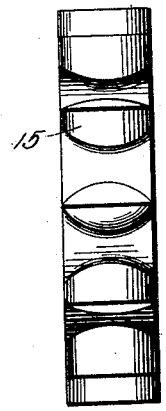
John D. Bates, Inventor.

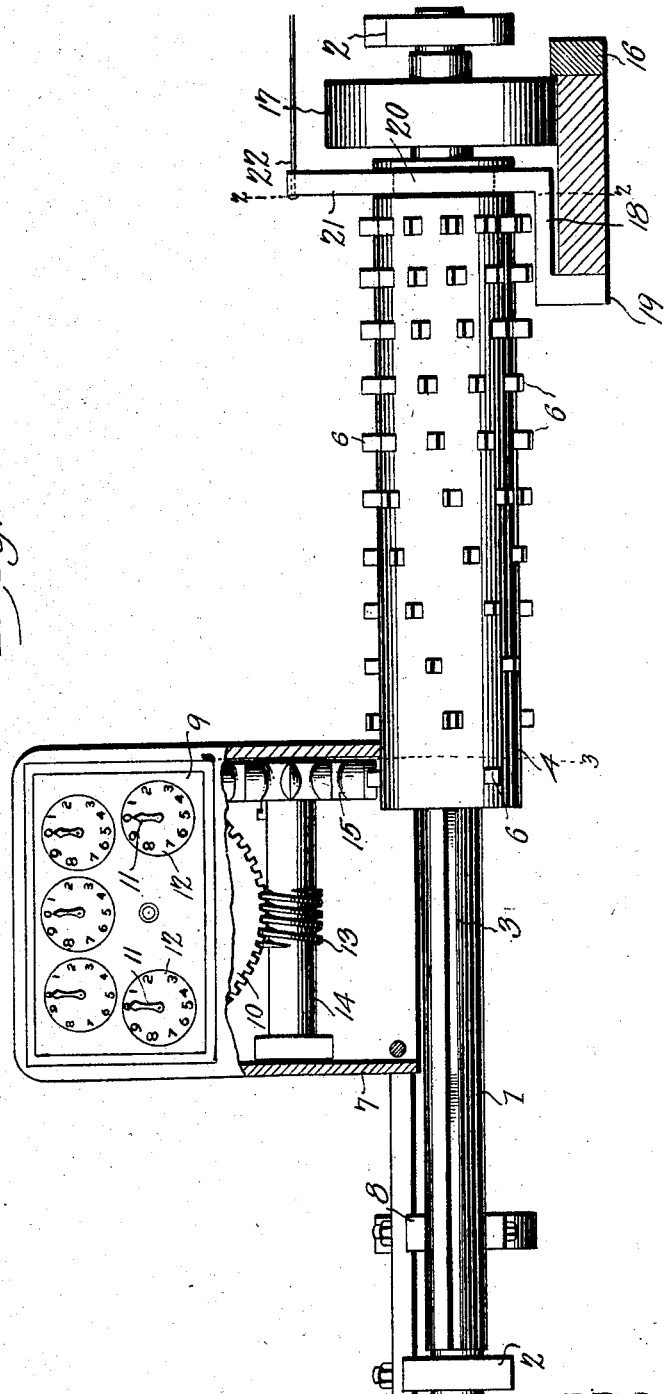

No. 732,697.

Patented July 7, 1903.

UNITED STATES PATENT OFFICE.

JOHN DAVIS BATES, OF CALAIS, MAINE.

LUMBER-SURFACE METER.

SPECIFICATION forming part of Letters Patent No. 732,697, dated July 7, 1903.

Application filed February 19, 1903. Serial No. 144,152. (No model.)

*To all whom it may concern:*

Be it known that I, JOHN DAVIS BATES, a citizen of the United States, residing at Calais, in the county of Washington and State of Maine, have invented a new and useful Lumber-Surface Meter, of which the following is a specification.

My invention relates to lumber-surface meters, and is especially designed for use as an attachment for planers, although it may be used in connection with other woodworking-machines.

The object of the invention is to provide a meter of simple construction which is adapted to measure accurately the surface of lumber while passing through a planing-machine and which shall be automatically adjustable for the measurement of pieces of lumber of different widths.

In the accomplishment of the object above stated I make use of the construction and combination of parts of a lumber-surface meter shown in preferred form in the accompanying drawings, in which corresponding parts are indicated by the same characters of reference throughout the various views and described and claimed in the following specification.

In the drawings, Figure 1 is a front elevation of the entire machine, showing a three-inch piece of lumber passing therethrough. Fig. 2 is a section on line 2 2 of Fig. 1, illustrating in enlarged detail the operating-collar of the tooth-cylinder. Fig. 3 is a detail sectional view on the line 3 3 of Fig. 1, and Fig. 4 is an enlarged end elevation of the operating spur-gear of the registering mechanism.

Referring to the drawings by reference characters, 1 represents a shaft supported in suitable bearings 2 2, which may be afforded by brackets secured to the planer-bed or on other suitable support. The shaft 1 has extending longitudinally thereof a key-seat 3, with which is engaged a feather 5, provided on the inner surface of a hollow cylinder 4, which is slidably mounted on the shaft 1 and made to rotate therewith by the engagement of the key 5. The cylinder 4 is provided with a number of circumferentially-disposed series of teeth or spurs 6. The spurs in the several series are of exactly similar contour and dimensions and are preferably exactly a quarter of an inch in width. These series are placed at equal intervals on the outer surface of the cylinder, and the number of teeth in each series is one less than the series immediately adjoining on the right and one more than the series immediately adjoining on the left. The distance between the adjoining series, measuring from a line passing through the middle of each tooth in one series to a similar line in the next series, is one inch, and the number of teeth in the different series ranges from three in the series at the left of the cylinder, as shown in the drawings, to twelve at the right of the cylinder, as shown in the drawings.

Supported above the left end of the shaft 1 by means of a bracket 7, the end of which is fastened to the bearing-block 2 and additional support for which is afforded by a member 8 is a frame 9, containing a registering mechanism, which may be of any suitable form. A simple and convenient form is that shown in the drawings, which consists of a gear-wheel 10, which operates through sets of gearing, (not shown,) and a series of hands 11, which rotate in front of dials 12. Motion is imparted to the gear 10 by means of a worm 13 on a shaft 14, the shaft 14 being rotated by means of a spur-gear 15 of the form shown, which is rigidly secured to the shaft and is adapted to engage with a series of teeth or spurs on the cylinder 4 in the manner hereinafter to be explained. The gear 15 is provided in the present instance with twelve teeth and should have a thickness of three-fourths of an inch at its periphery.

At the end of the shaft 1 which lies nearest the planer-guide, which is indicated at 16, there is mounted a friction-roll 17, which should measure exactly one foot in circumference to work accurately with parts of the proportions previously specified. Rotatably mounted on the end of the cylinder 4 adjacent to the roller 17 is a bent member 18, having a downward projection 19, which is adapted to engage with the edge of the piece of lumber passing through the planer, which is opposite the edge that lies in contact with the planer-guide 16. The member 18 also has a collar 20, which fits into a groove circumferentially formed on the end of the cylinder 4 to insure the rotation of the cylinder within said collar without permitting any sliding longitudinally therein. The upward projection 21 on the collar 20 is connected by a line 22 with a suitable weight, (not shown,) which serves to hold the downward projection 19 always in contact with the edge of the material passing through the planer, and so determines what series of spurs or teeth on the surface of the cylinder 4 will engage with the gear 15. In the drawings the piece of material passing through the planer is supposed to have a width of three inches, and the series of teeth at the extreme left of the cylinder 4 is in position to engage with the gear 15. A piece of material of three inches width is as narrow a piece as a meter constructed with parts in the proportions above specified is adapted to measure. A machine to measure narrower pieces would be of little value, for the reason that lumber narrower than three inches in width is not sold by the surface area, but by linear measure, and consequently there is no reason to have a lumber-surface meter adapted to measure the surface of such narrow stuff. If a piece of greater width than three inches is to be passed through the planer, the cylinder 4 must be moved to the left along the shaft 1 and space enough made between the annular projection 19 on the member 18 and the planer-guide 16 to permit the insertion of the piece of material to be planed. The cylinder 4 is then released and the weight on the end of the cord 22 draws the cylinder toward the right until the projection 19 engages with the edge of the material to be planed. When the projection 19 comes into contact with the material to be planed, that series of teeth in which the number of teeth corresponds to the width in inches of the piece to be planed will be in position to engage with the gear 15. This is clearly evident from the fact that the series of teeth are an inch apart, and, as explained above, when a strip three inches wide is in the planer that series of teeth in which the number of teeth is three is in position to engage the spur-gear 15.

The operation of the meter in measuring lumber is as follows: Let it be assumed that the piece to be planed has been inserted into the machine, the projection 19 having contact with the edge of the piece by the action of the weight at the outer end of the cord 22 and the series of teeth indicating the number of inches in the width of the piece of lumber is in position to engage the gear 15. The roller 17 at the right end of the shaft is in frictional engagement with the upper surface of the material passing through the planer, and as said roller is exactly one foot in circumference every revolution of the roller will measure the passage of one foot of material under it and will cause one revolution of the cylinder 4. Now when a revolution of the cylinder 4 occurs each one of the teeth in the series in engagement with the gear 15 will come succesively in contact with the teeth of the said gear and cause it to turn through a certain part of a rotation, each tooth in the series on the cylinder 4 moving the gear 15 through one-twelfth of a revolution. Accordingly if it be assumed that the number of teeth in the series engaging the gear 15 is six a half-revolution of the gear 15 will be caused by the revolution of the cylinder 4, and this will mean the passage of lumber having a surface measure of one-half square foot under the roller 17. If the piece of lumber passing through the machine has the maximum width which the meter shown is capable of measuring—namely, twelve inches—the series of teeth at the extreme right of the cylinder 4 will engage the gear 15 and each revolution of the cylinder 4 will cause a complete revolution of the gear 15.

In the statement of the proportions of the parts of the meter given in a preceding paragraph the preferred width at the periphery of the gear 15 was given as three-fourths of an inch. This width is chosen for the reason that lumber is not measured with absolute accuracy, but fractions of less than one-half an inch in width are disregarded. So by making the width of the gear 15 three-fourths of an inch the gear will engage with the teeth of the series which contains six teeth, when the piece of lumber passing through the planer has a width of five and one-half inches or more up to nearly six and one-half inches, when, as the spurs or teeth on the cylinder 4 have a width of one-fourth of an inch, the gear 15 will engage with the series of teeth whose number is seven. Thus it is clear that the registration on the dials of the meter will always correspond to the measurement of the surface of the lumber in what is known as "board measure"—that is, a measurement in which fractions of less than one-half an inch width are disregarded and fractions of one-half an inch or more are estimated as units, as stated above.

While the meter above described is adapted for the measurement of pieces of material whose width ranges from three inches to twelve inches only, it is obvious that a meter constructed to operate in the same way could be made to measure pieces of any desired width, and I do not desire to be limited to the form and proportions or exact mode of assemblage of the parts of the lumber-surface meter above described and shown in the drawings.

While the device shown in the accompanying drawings for holding the downward projection 19 in contact with the edge of the lumber to be measured is the preferred form, it is to be understood that various changes in the form and minor details thereof may be made without departing from the spirit or sacrificing any of the advantages of the invention.

Having thus fully described the construc- tion and operation of my invention, what I regard as new, and desire to secure by Letters Patent, is—

1. The combination in a lumber-surface meter of a toothed cylinder having a plurality of circumferential series of teeth extending entirely around said cylinder, a register adapted to be operated by the teeth of any of said series, and means for holding said cylinder in such position that the series of teeth whose number corresponds to the width of the lumber passing through the machine may operate the register.

2. The combination in a lumber-surface meter, of a shaft, a toothed cylinder having a plurality of circumferential series of teeth in which the number of teeth in each series increases uniformly from one end of the cylinder toward the other, a register adapted to be operated by the teeth on said cylinder, and means operative by the passage of a piece of lumber through the machine for rotating said shaft.

3. The combination in a lumber-surface meter, of a cylinder, a plurality of series of teeth arranged circumferentially upon said cylinder and extending entirely around said cylinder, the numbers of the teeth in the several series corresponding to the different widths of lumber adapted to be measured by the meter, a register adapted to be operated by any one of said series of teeth, means for rotating said cylinder at a speed corresponding to the rate of travel of the lumber through the machine, and means for holding said cylinder in such position that the series of teeth corresponding to the width of the lumber passing through the machine may engage with and operate said register.

4. The combination in a lumber-surface meter, of a rotatable cylinder having a plurality of circumferential series of teeth extending entirely around said cylinder and spaced equidistant along said cylinder, the numbers of the teeth on said series corresponding to the measurements of the widths of the lumber to be measured by said meter, a register adapted to be operated by any one of said series, and automatic means for holding the cylinder in proper relation to the register.

5. In a lumber-surface meter adapted for use on planing-machines or the like, a shaft rotatably mounted over the bed of the machine, a roller upon one end of said shaft adapted to engage frictionally with lumber passing through the machine, a registering device near the other end of the said shaft, and a cylinder rotatable with said shaft but slidable thereon, said cylinder having a plurality of series of teeth circumferentially disposed on its surface, the number of teeth in each series decreasing regularly from the end of the cylinder adjoining the roller to the other end.

6. In a lumber-surface meter for planing-machines and the like, a shaft rotatably mounted over the bed of the machine, a cylinder rotatable with and slidable on said shaft, said cylinder being provided with a plurality of series of teeth circumferentially disposed on said cylinder and the number of teeth in the various series decreasing from one end of the cylinder to the other, a roller carried by said shaft and adapted to engage with the lumber passing through the machine and adapted to impart to said shaft a uniform speed of rotation, a registering device adapted to be operated by a series of teeth on the cylinder, a member provided at one end of said cylinder to engage with the edge of a piece of lumber passing through the machine and to hold the toothed cylinder in position for the series of teeth whose number corresponds to the measurement of the width of the piece of material, to operate the register.

In testimony that I claim the foregoing as my own I have hereto affixed my signature in the presence of two witnesses.

JOHN DAVIS BATES.

Witnesses:
JAMES M. BECKETT,
RALPH A. BARKER.